March 8, 1927.
G. F. MOYERS
POULTRY FEEDER
Filed Sept. 7, 1926
1,620,607
2 Sheets-Sheet 2
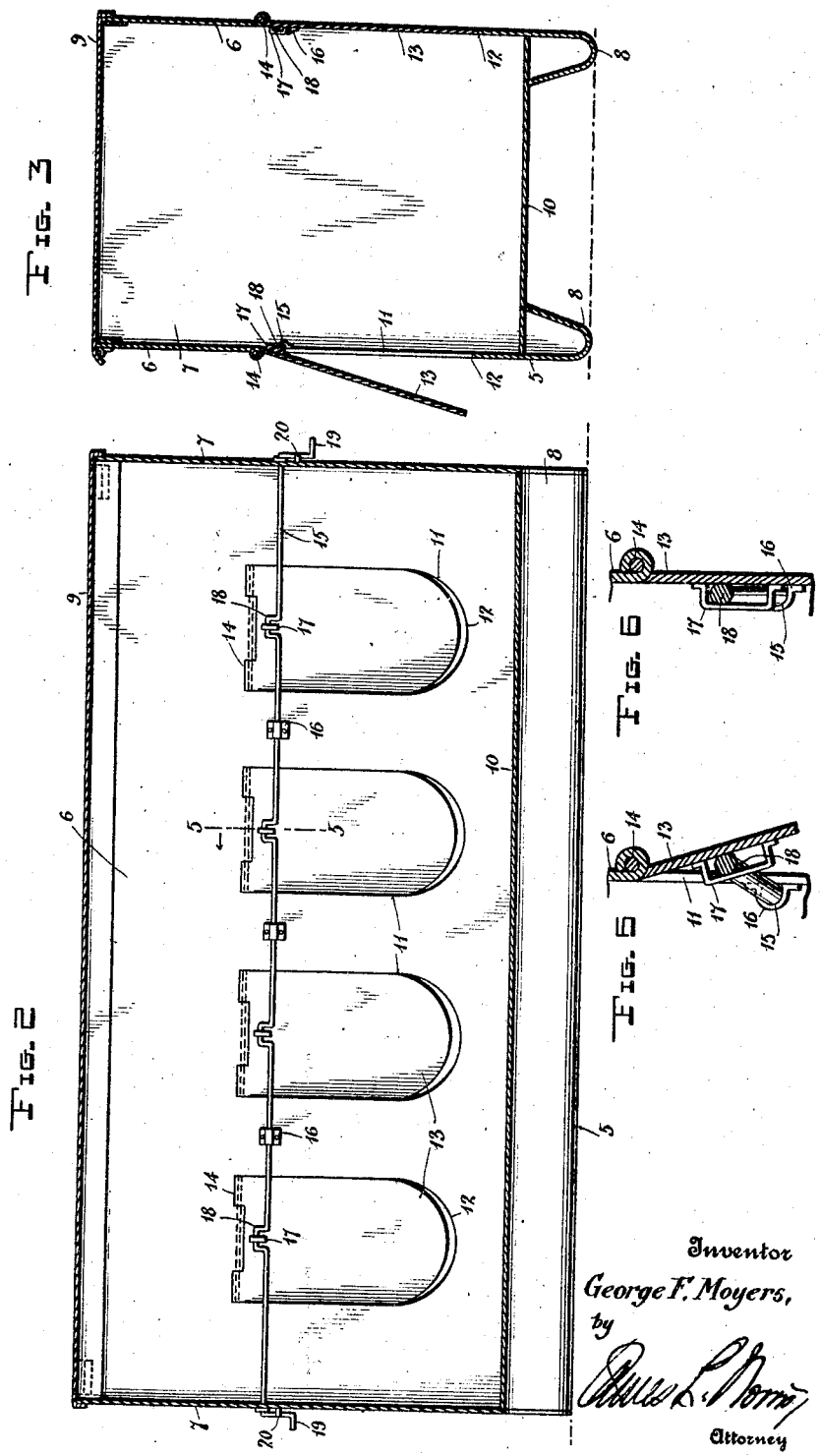

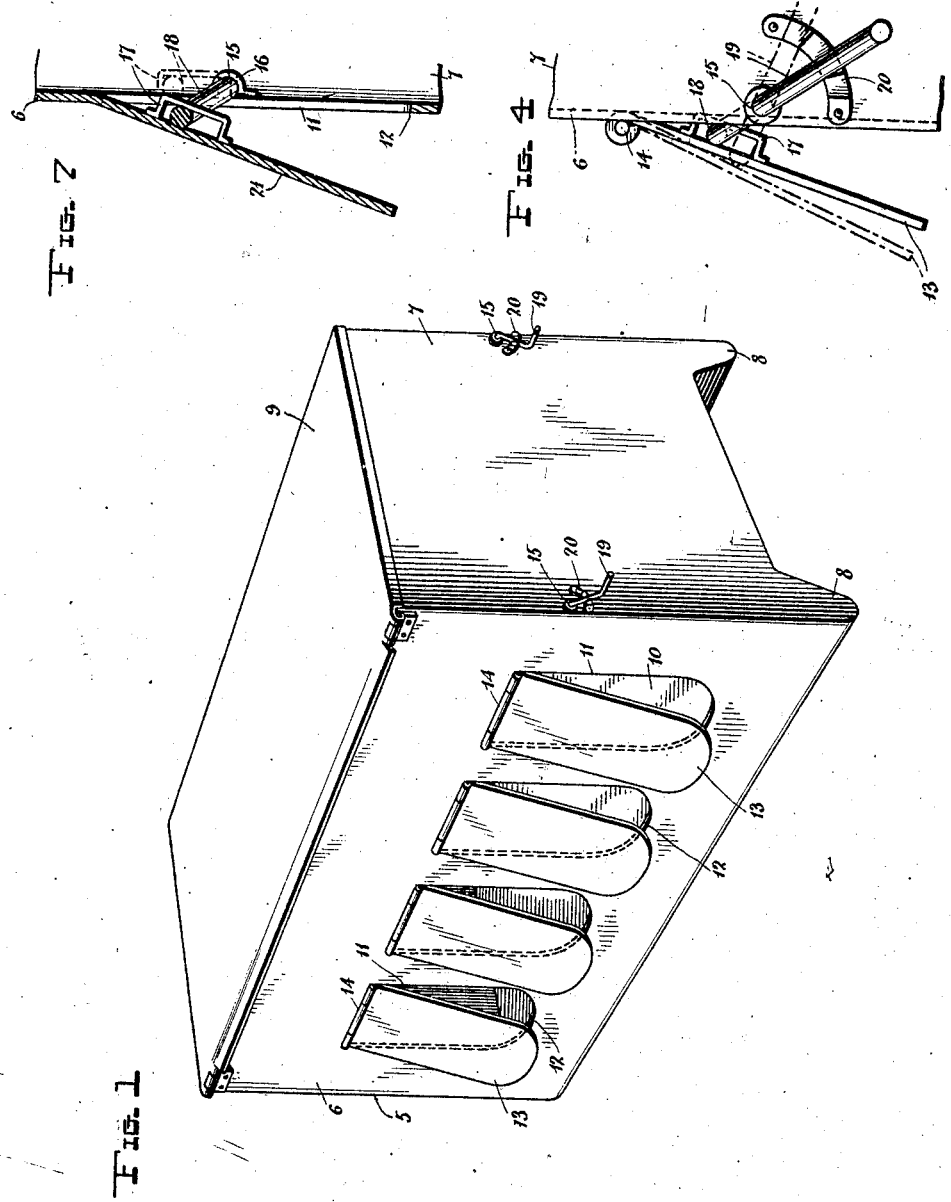

Patented Mar. 8, 1927.

1,620,607

UNITED STATES PATENT OFFICE.

GEORGE F. MOYERS, OF OSCEOLA, IOWA.

POULTRY FEEDER.

Application filed September 7, 1926. Serial No. 133,934.

This invention relates to poultry feeders, and the primary object of the same is to provide a feeder of the class which is readily interiorly accessible and has openings in opposite portions with cooperating adjustable closing means, which also serve as guards to prevent grown fowls from obtaining the feeding material but permit young chicks to easily reach the feeding material through the said openings, the adjustable closing means being operable to accommodate the growth of the young chicks or fowls by increasing the exposed portions of the openings and at the same time obstruct the attempts of grown fowls to reach the feeding material within the feeder.

With the foregoing and other objects and advantages in view, the invention consists in the construction and arrangement of the several parts which will be more fully hereinafter described and claimed.

In the drawings:

Fig. 1 is a perspective view of a poultry feeder embodying the features of the invention;

Fig. 2 is a longitudinal vertical section of the same;

Fig. 3 is a transverse vertical section thereof;

Fig. 4 is an elevation of a portion of one end of the feeder on an enlarged scale, showing means for operating the closing means and holding the latter in adjusted position;

Fig. 5 is a sectional view on the line 5—5, Fig. 2, showing a part of the mechanism for operating the closing means for the feeder openings, the closing means being shown in partially open position;

Fig. 6 is a view similar to Fig. 5, showing the closing means in closed position, and Fig. 7 is a detail sectional view of a portion of the feeder, showing a modification in the manner of mounting the doors or closures.

The numeral 5 designates the improved feeder, which may be of any dimensions and formed of suitable material, preferably galvanized sheet metal, though wood may be used at times if desired. The feeder is also shown by Fig. 1 in a preferred shape, but the exact contour of the body of the feeder is not particularly essential as far as the features of the invention are concerned. The body or receptacle in the present instance is of rectangular form and provided with sides 6 and ends 7 with opposite depending supporting means 8, the body also having a hinged cover 9 which renders the interior of the body readily accessible for supplying the feed or feeding material thereto and also for cleaning purposes. The bottom 10 of the body or receptacle as shown by Figs. 2 and 3 is horizontally disposed, and it is also proposed, if desired, to include in the interior structure of the improved feeder such accessories as are usually adopted in devices of this character. The feeding material, however, may be disposed directly on the bottom 10. In the opposite sides 6 of the body or receptacle a plurality of openings 11 are formed and extend vertically, the lower walls 12 of the openings being of concave form so as to permit young fowls to readily insert their heads into the lower portions of the openings and reach the feeding material. Any number of these openings may be used, the number provided depending upon the dimensions of the feeder as a whole. The openings 11 are provided with doors or closures 13, hinged at their upper ends adjacent to the upper terminal walls of the said openings as at 14. The doors or closures 13 are of the same shape as the openings 11 and are preferably of such dimensions as to fit within and entirely close the said openings. The doors as shown by Fig. 1, for instance, are partially open and the means for opening and closing the said doors and particularly for holding the same open at various angles consists of a rod 15 having bearing in the opposite ends 7 of the body or receptacle through which the rod extends. There will be one of these rods associated with each set of doors or closures 13, the rod being given positive mounting between the openings 11 by bearing clips 16 secured against the inner surfaces of the sides 6. The rods extend across the inner portions of the doors or closures 13 a predetermined distance below the upper hinged extremities of said doors or closures, and at the center of the said doors or closures are loops or keepers 17, which are secured to the doors, and each rod 15 is formed with a series of cranks 18 which extend through the loops or keepers 17. On one or both ends as may be desired each rod is provided with a crank handle 19, and adjacent thereto is a segmental catch member 20 with which the said crank handles are adapted to engage and hold the rods and doors 13 in either outwardly projected adjustable positions or fully closed inwardly with respect to the openings 11. The means for holding each rod 15 in adjusted position as just explained is only one of a number of structures that might be adopted for holding the doors in either outwardly projected or inwardly closed position. The doors may at times be opened at the opposite sides of the body or receptacle or one set of doors opened and the other closed.

The operation of the improved feeder is very simple. The feeding material is placed within the body or receptacle and either one or both of the rods 15 are then operated to project the doors or closures 13 outwardly far enough to give access to the feeding material through the openings 11 within the body or receptacle. The doors or closures 13 will be opened at first just far enough to permit very young chicks to insert their heads through the lower portions of the openings 11 and thereby prevent older fowls from reaching the feeding material, and as the chicks grow or become larger, the doors or closures may be opened wider to accommodate such growth and still prevent grown or older fowls from disposing their heads in such position as to gain access to the feeding material through the openings 11. It will be seen that when either rod 15 is operated to open the doors or closures 13, the cranks 18 press against the inner sides of the doors within the loops or keepers 17, the latter being long enough to allow the cranks 18 to have a maximum movement in an outward direction. After the rods have been turned to a sufficient degree and the doors or closures projected as desired, the latter will remain in their projected position through the medium of the engagement of the crank handles 19 with the segmental adjusting members 20.

It is proposed to insert any desired feeding material in the improved feeder and the latter may be protected in case of storms by shutting the doors or closures 13.

In view of the means provided for regulating the open condition of the doors 13 and preventing grown fowls from reaching the feeding material, economy in the use of feeding material results and the young chicks are not deprived of the feed particularly intended for them. All of the doors or closures 13 on each side are connected to one rod and simultaneously operated to either open or close the same, and moreover, the doors are strengthened by this association with a single operating means and will be uniformly opened when the rod is operated, as all of the cranks 18 are of the same dimensions and have the same angular relation to the rod.

In Fig. 7 a modification of the improved feeder is shown and consists in making the doors or closures 21 integral with the adjacent side 6 of the feeder so that the said doors may be bent outwardly and inwardly, the remaining features of the invention being the same and bearing similar reference characters, as for instance the operating rod 15, crank 18 and elongated loop 17 in connection with each door or closure and whereby the said door or closure may be adjusted similarly to the doors or closures 13 shown by the preceding figures.

What is claimed as new is:

1. A poultry feeder comprising a receptacle having outer vertical straight side with a plurality of openings therein, closures for said openings hinged at their upper ends and movable outwardly and inwardly at their free ends to vary the size of the clearance of the openings, an operating means engaging all of the closures and provided with cranks to uniformly vary the angle of said closures.

2. A poultry feeder comprising a receptacle having a plurality of openings formed therein, doors cooperating with said openings and hinged at their upper ends, the doors having loops secured to their inner sides, a single rod having cranks engaging the loops of all of the doors to uniformly operate the latter, and means for holding the rod and its cranks and the doors in adjusted position.

3. A poultry feeder comprising a receptacle having a plurality of openings in opposite sides thereof, hinged closures for said openings, and means for uniformly operating the closures on each side and for holding the closures in adjusted position, whereby grown fowls will be prevented from depriving chicks of the feeding material contained within the receptacle.

4. A poultry feeder comprising a receptacle having vertical outer sides with a plurality of openings therein, closures for said openings having their upward ends only connected to the opposite sides of the receptacle at the upper part of the openings, and operating means engaging all of the closures and provided with means common to all of these said closures for uniformly opening and closing the said closures.

In testimony whereof I have hereunto set my hand.

GEORGE F. MOYERS.